US009712496B2

(12) United States Patent
Zivkovic et al.

(10) Patent No.: US 9,712,496 B2
(45) Date of Patent: Jul. 18, 2017

(54) SIGNAL MODULATION FOR SECURE COMMUNICATION

(71) Applicant: NXP B.V., Eindoven (NL)

(72) Inventors: Zoran Zivkovic, Hertogenbosch (NL); Frank Leong, Veldhoven (NL)

(73) Assignee: NXP B.V., Eindhoven (NL)

( * ) Notice: Subject to any disclaimer, the term of this patent is extended or adjusted under 35 U.S.C. 154(b) by 51 days.

(21) Appl. No.: 14/698,226

(22) Filed: Apr. 28, 2015

(65) Prior Publication Data

US 2016/0323246 A1    Nov. 3, 2016

(51) Int. Cl.

| H04L 29/06 | (2006.01) |
|---|---|
| H04W 12/06 | (2009.01) |
| H04L 27/26 | (2006.01) |
| G07C 9/00 | (2006.01) |
| G01S 13/74 | (2006.01) |

(52) U.S. Cl.
CPC .......... *H04L 63/04* (2013.01); *H04L 27/2627* (2013.01); *H04W 12/06* (2013.01); *G01S 13/74* (2013.01); *G07C 9/00309* (2013.01)

(58) Field of Classification Search
CPC .... H04L 63/04; H04L 27/2627; H04W 12/06; G07C 9/00309; G01S 13/74
USPC ............................................................ 726/3
See application file for complete search history.

(56) References Cited

U.S. PATENT DOCUMENTS

| 6,072,316 A | 6/2000 | Burnett | |
|---|---|---|---|
| 6,219,262 B1 * | 4/2001 | Burgyan | ........... H02M 3/33507 363/21.04 |
| 7,444,118 B2 | 10/2008 | Boh et al. | |
| 8,620,394 B2 | 12/2013 | Sebastiano et al. | |
| 2002/0143545 A1 * | 10/2002 | Tamura | ..................... G10H 1/02 704/266 |
| 2006/0083406 A1 | 4/2006 | Shimura et al. | |
| 2011/0080877 A1 | 4/2011 | Nentwig | |
| 2012/0105219 A1 | 5/2012 | Kofler | |

(Continued)

OTHER PUBLICATIONS

Extended European Search Report for Patent Appln. No. 16166211.9 (Jul. 4, 2016).

(Continued)

*Primary Examiner* — Kambiz Zand
*Assistant Examiner* — Benjamin Kaplan
(74) *Attorney, Agent, or Firm* — Rajeev Madnawat

(57) ABSTRACT

Aspects of the present disclosure are directed to circuits, apparatuses and methods for generating communication signals resistant to early-detect-late-commit attacks. An example embodiment, a plurality of data symbols is generated that includes first and second data symbols. A communication signal is generated that is decodable according to a mapping of the first and second data symbols to respective first and second waveforms. The first waveform has a leading edge that is indicative of the first waveform, and second waveform has a second leading edge that is indicative of the second waveform. In generating the communication signal, a first portion of the communication signal is modulated according to the first waveform for the first data symbol. A second portion of the communication signal is modulated, for the second data symbol, according to a modified second waveform having a leading edge that is indicative of the first waveform.

20 Claims, 7 Drawing Sheets

(56) References Cited

U.S. PATENT DOCUMENTS

2013/0214732 A1    8/2013  Nowottnick

OTHER PUBLICATIONS

Kuhn, M. et al. "UWB impulse radio based distance bounding", IEEE in Proc. Workshop Positioning, Navigation Comm, pp. 28-37 (Mar. 2010).
Clulow, J. et al. "So Near and Yet So Far: Distance-Bounding Attacks in Wireless Networks", In Security and Privacy in Ad-hoc and Sensor Networks, pp. 83-97 (Jan. 2007).
Flury et al., "Effectiveness of Distance-Decreasing Attacks Against Impulse Radio Ranging", WiSec 2010.
Poturalski et al., "Distance Bounding with IEEE 802.15.4a: Attacks and Countermeasures", IEEE Transactions on Wireless Communications, vol. 10, No. 4, Apr. 2011.
Poturalski et al., "On Secure and Precise IR-UWB Ranging", IEEE Transactions on Wireless Communications, vol. 11, No. 3, Mar. 2012.
AMS, AS3932 Datasheet—Applications "3D Low Frequency Wakeup Receiver", Revision 1.7, pp. 1-34, www.ams.com/LF-Receiver/AS3932.
M. van Elzakker et al., "A 10-bit Charge-Redistribution ADC Consuming 1.9uW at 1 MS/s," IEEE JSSC, May 2010.
I.-Y. Lee et al., "A Fully Integrated TV Tuner Front-End with 3.1 dB NF, >+31dBm OIP3, >83dB HRR3/5 and >68dB HRR7," IEEE ISSCC, 2014.
Harpe et al., "A 0.47-1.6 mW 5-bit 0.5-1 GS/s Time Interleaved SAR ADC for Low-Power UWB Radios," IEEE JSSC, Jul. 2012.
J. van Sinderen et al., "Wideband UHF ISM-Band Transceiver Supporting Multichannel Reception and DSSS Modulation," IEEE ISSCC, 2013.

* cited by examiner

SIGNAL MODULATION FOR SECURE COMMUNICATION

Aspects of various embodiments are directed to communication of data and authentication of devices using pulse based waveforms. Many applications require synchronization and authentication, which have been implemented using a multitude of approaches. For instance, radio frequency (RF) ranging systems often employ a time-of-flight principle to determine a distance between two objects, or markers on objects, that are communicating between one another. Proximity can be used from a security and authentication perspective, such as by ensuring that a remote device to be connected to a local device is within a predetermined threshold distance of the local device (e.g., to prevent unwanted connections to other devices in relative proximity). Security information can also be communicated, in connection with the time-of-flight communication.

In many applications, a waveform (e.g., a pulse) can be transmitted and reflected or retransmitted by an object or marker on an object. Based on the amount of time it takes for the reflection or retransmission to return to the original transmitter, the distance between the objects, or markers on the objects, can be ascertained.

While various approaches have been implemented for communication or authentication using pulse based waveforms, such communications may be susceptible to unwanted interception and/or manipulation. These issues can be particularly relevant to certain types of communications, such as in vehicle access and secure payment systems. These and other matters have presented challenges to communications and related aspects such as distance-based verification, for a variety of applications.

Various example embodiments are directed to circuits, apparatuses and methods for generating communication signals resistant to early-detect-late-commit (EDLC) attacks. In accordance with an example embodiment, a method is disclosed for generating a communication signal decodable according to a mapping of first and second data symbols to respective first and second waveforms. The first waveform has a leading edge that is indicative of the first waveform and a second waveform has a second leading edge that is indicative of the second waveform. A plurality of data symbols is generated that includes the first and second data symbols. A first portion of the communication signal is modulated according to the first waveform for the first data symbol. A second portion of the communication signal is modulated according to a modified second waveform for the second data symbol. The modified second waveform has a leading edge that is indicative of the first waveform. The communication signal is then transmitted on a transmission medium.

In accordance with another example embodiment, an apparatus includes a first circuit configured to generate a plurality of data symbols that includes a first data symbol and a second data symbol. A second circuit is coupled to the first circuit and is configured to generate a communication signal that is decodable according to a mapping of the first and second data symbols to respective first and second waveforms. The first waveform has a leading edge that is indicative of the first waveform and the second waveform has a leading edge that is indicative of the second waveform. The second circuit includes a modulation circuit configured to modulate a first portion of the communication signal according to the first waveform for the first data symbol. The modulation circuit is also configured to modulate a first portion of the communication signal according to a modified second waveform for the second data symbol. The modified second waveform has a leading edge that is indicative of the first waveform. The apparatus also includes third circuit coupled to the second circuit and configured to transmit the communication signal over a transmission medium.

The above discussion/summary is not intended to describe each embodiment or every implementation of the present disclosure. The figures and detailed description that follow also exemplify various embodiments.

Various example embodiments may be more completely understood in consideration of the following detailed description and in connection with the accompanying drawings, in which.

Figure 1:
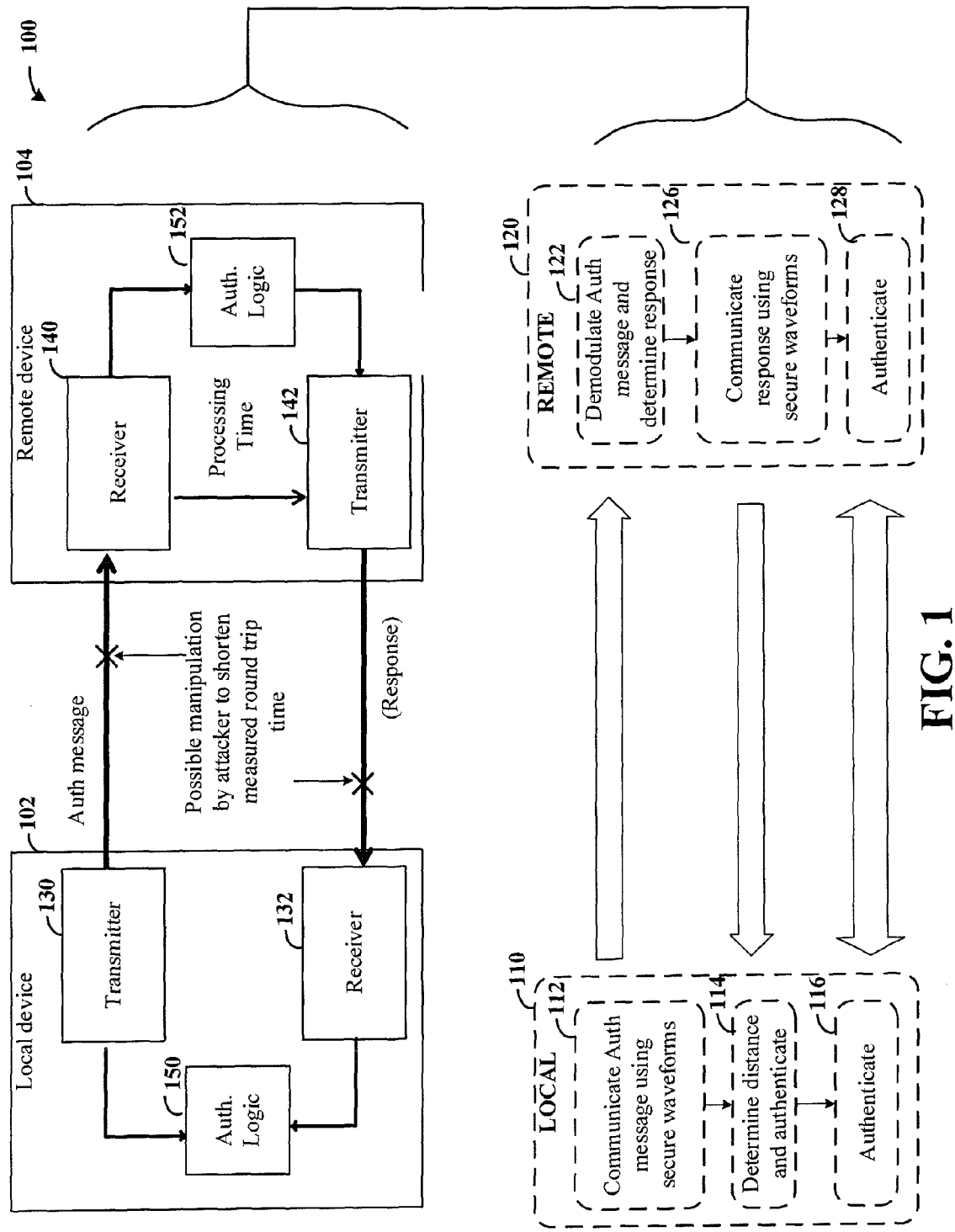
FIG. 1 shows a system configured to perform distance-based authentication, in accordance with various embodiments.

While various embodiments discussed herein are amenable to modifications and alternative forms, aspects thereof have been shown by way of example in the drawings and will be described in detail. It should be understood, however, that the intention is not to limit the invention to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

Aspects of the present disclosure are believed to be applicable to a variety of different types of apparatuses, systems and methods involving the communication of data using pulse waveforms. It is recognized that the waveforms of individual pulses may be limited by regulated bandwidth restrictions for a communication protocol (e.g., limits on emissions in certain frequencies or) or by capabilities of conventional transmitter equipment. Due to such limitations, pulse shaped waveforms generally include leading and trailing edges that can be manipulated by an attacker, who may intentionally violate bandwidth restrictions and may use higher performance equipment. Aspects of the present disclosure have been shown to be beneficial when used in the context of communications signals susceptible to early-detect-late-commit (EDLC) attacks. For example, one or more embodiments may be adapted to prevent EDLC attack in a distance-based authentication. While not necessarily so limited, various aspects may be appreciated through a discussion of examples using such exemplary contexts.

In an EDLC attack, a leading edge of a transmitted waveform may be examined by an attacker to provide an early prediction of what waveform is transmitted. For example, in a modulation scheme using a positive pulse to encode a logic 1 and a negative pulse to encode logic 0, a rising leading edge may indicate that the following waveform is a pulse corresponding to a logic 1. After predicting the transmitted pulse waveform, the attacker may manipulate the transmission to make it appear to a receiver that the pulse waveform arrived at an earlier time. For instance, a signal may be boosted by an attacker during a rising edge of a pulse waveform to cause the signal to shorten the rise time and cause a receiver to detect the pulse waveform at an earlier time. By making it appear that the pulse waveform arrived at an earlier time, the apparent transmission time and apparent distance between devices may be reduced. The amount that an attacker may manipulate the distance calculation depends on the similarity leading edges of the pulse waveforms, length of the leading edges, signal to noise ratio in the environment, and/or accuracy of equipment employed to examine leading edges.

One or more embodiments are configured to inhibit EDLC attack by communicating data using waveforms that are not predictable from an examination of leading edges. For example, in one embodiment, a plurality of data symbols is generated that includes the first and second data symbols. A first portion of a communication signal is modulated according to the first waveform for the first data symbol. The second portion of the communication signal is modulated according to a modified second waveform for the second data symbol. The modified second waveform has a leading edge that is indicative of the first waveform. The communication signal is transmitted on a transmission medium. For ease of reference, waveforms that are not predictable from an examination of leading edges, may be referred to as secure waveforms. Conversely, waveforms that are predictable from an examination of leading edges, may be referred to as unsecure waveforms.

Different embodiments may be adapted to generate communication signals compatible with various modulation schemes that are susceptible to EDLC attack. For instance, a receiver may be configured to demodulate a communication signal having respective data values represented by first and second waveforms. The modulation scheme is susceptible to EDLC attack if the first waveform has a leading edge that is indicative of the first waveform, and second waveform has a second leading edge that is indicative of the second waveform. One or more embodiments are configured to reduced susceptibility to EDLC attack by modifying leading edges of one of the waveforms to also be indicative of the other waveform—thereby inhibiting early detection based on examination of the leading edges. For example, the leading edge of the second waveform in the may adapted to be indicative of the first waveform.

A receiver may be configured to distinguish between different waveforms based on differences in one or more transmission characteristics including, for example, amplitude, frequency, and/or phase of a waveform. For ease of reference, a transmission characteristic for which the first and second waveforms differ by a measurable amount above a noise margin may be referred to as a distinguishing characteristic. A distinguishing characteristic is considered indicative of the first waveform if the value of the characteristic is above an upper threshold. Conversely, the distinguishing characteristic is considered indicative of the second waveform if the value of the characteristic is below a lower threshold. As an illustrative example, for on-off key modulation, a leading edge of a transmitted waveform may be indicative of a first waveform (e.g., pulse present) if the leading edge exceeds an upper threshold amplitude. Conversely, the leading edge of the transmitted waveform may be indicative of a second waveform (e.g., pulse absent) if the leading edge falls short of a lower threshold amplitude. The waveforms may be made secure by modifying distinguishing characteristics (e.g., amplitude, frequency, phase, and/or shape) of a leading edge of one of the waveforms to instead exhibit characteristics indicative of the other waveform.

Different embodiments may be applied to a variety of applications susceptible to EDLC attack. One or more embodiments are configured to reduce susceptibility to EDLC attack in a distance-based authentication. Distance-based authentication may be used to restrict access to devices within a threshold range of a base station transmitter. A distance-based authentication process may determine distance to a device using time of flight. For example, a base station may transmit a waveform such as a chirp or a pulse, which is either reflected or retransmitted by a remote device. Based on the amount of time it takes for the reflection or retransmission to reach the base station, the distance between the objects can be calculated. However, determination of distance based on time of flight is susceptible to EDLC attack. For instance, an attacker that is closer to a transmitter, or using a higher quality receiver, may predict waveform pulses based on leading edge of a waveform, and supplement the transmitted waveform to cause the receiver to detect the waveform earlier than it would otherwise be detected. By causing the pulse to be detected earlier, the time of flight and the calculated distance is reduced.

In some implementations, distance may be calculated based on a round trip time to communicate a first message (e.g., time-of-flight challenge) from a first RF device to a second RF device and to communicate a second message (e.g., time-of-flight response) from the second RF device back to the first RF device. In some other implementations, communication between first and second devices may be synchronized (e.g., by way of a side channel), and distance may be calculated based on one-way transmission time for communicating between the first and second RF devices.

One or more embodiments are configured to prevent EDLC attack in a distance-based authentication by communicating authentication data (e.g., a challenge message and/or response message) using waveforms that are not easily predictable from an examination of leading edges. For instance, prediction of waveforms can be prevented by configuring leading edges of the waveforms to exhibit substantially similar characteristics (e.g., slope, amplitude, polarity, and/or shape). A characteristic of the leading edges, such as shape, may be considered to be substantially similar if cumulative difference of the characteristic between the two leading edges is less than a threshold difference (e.g., corresponding to a noise margin used for detection of waveforms for the particular modulation scheme and transmission medium).

The embodiments may be applied to secure distance-based authentication in a number of applications. For example, distance-based authentication may be used in automotive applications to restrict authentication or functionality of a key fob. In some embodiments, a control system in an automobile is configured to trigger actions of one or more systems in the automobile in response to verification that a key fob being within an authorized range. For instance, a passive keyless entry (PKE) system may be configured to only open doors if the key fob is within a threshold range (e.g., 2 meters), or only start the vehicle if the key fob is within the vehicle.

As another example, distance-based authentication may be used in secure payment systems to block transactions where a distance between a smart card and a reader (e.g., employing near field communications (NFC)) is greater than a threshold range (e.g., 10 cm).

In some embodiments, various authentication mechanisms may be used in combination with distance-based authentication. As one example, a challenge-response mechanism may be used to authenticate an RF device. For instance, a challenge message may be communicated from a base station to an RF device to be authenticated. The challenge message may include for example, an encrypted data message. The RF device decrypts the data message using a secret encryption key assigned to produce the appropriate response message. If the data was correctly decrypted, the correct response message will be communicated back to the base station and the identity of the RF device is verified.

For an EDLC attack on a distance-based authentication that uses a challenge-response mechanism, an attacker must correctly predict each waveform in the challenge or response message that is being manipulated by the attacker. For instance, in an attack of an authentication that uses OOK modulation, if an attacker incorrectly predicts a pulse-absent waveform to be a pulse-present waveform, boosting the leading edge may cause the receiver to detect the incorrect waveform. As a result, at least one bit of the challenge message or response message will be incorrectly received. If too many bits are incorrectly received, the authentication will fail. The number of incorrect bits that may be tolerated before verification fails may vary depending on the scheme used for verification. For example, certain verification solutions may use error correction codes that allow for a certain number of incorrect bits. Various embodiments contemplate modifying/obscuring a sufficient number of pulses to be sure that the acceptable number of wrong bits would be exceeded by a potential attacker.

In some embodiments, all data symbols of authentication data are communicated using secure waveforms that are not predictable from an examination of leading edges. In some other embodiments, a subset of data symbols of the authentication data are communicated using the secure waveforms and other data symbols of the authentication data are communicated using unsecure waveforms. In some implementations, data symbols to be communicated using secure waveforms may be determined by a random or pseudo-random selection.

As previously indicated, waveforms may be made secure by causing leading edges of two or more waveforms to be substantially similar. Additionally or alternatively, waveforms may be made secure by randomly or pseudo-randomly selecting a leading edge for a waveform each time the waveform is to be used to modulate a signal. As one example, waveforms for binary phase shift keying (BPSK) modulation may be distinguishable from each other by polarity (e.g., 0 or 180 degree phase shift). By randomly selecting a leading edge for the waveforms from set of leading edges having different polarities, the waveforms cannot be consistently predicted from examination of leading edge. This technique can be adapted for higher order modulation schemes, which use more than 2 possible waveforms to modulate a signal. For instance, N phase shift keying (N-PSK), uses N waveforms having N different phase shifts. The N waveforms may be made secure by randomly or pseudo-randomly selecting a leading edge for a waveform each time the waveforms is to be used to modulate a signal. Leading edges may be selected, for example, from a plurality of leading edges, each having a respective polarity.

In some embodiments, the leading edge of waveform may be selected to encode a data value in addition to a data value represented by the main portion of the waveform. For example, a first waveform, a second waveform, a modified first waveform, and a modified second waveform may respectively represent four two-bit values 00, 01, 10, and 11. By using the leading edges to encode additional data values effective bandwidth of the communication can be increased. Similarly, in some implementations trailing edges of waveform may be modified to represent additional data values.

The embodiments may be adapted for use with distance-based authentication over various transmission mediums including wired transmission mediums (e.g., Ethernet, cable, and/or fiber optic), or wireless transmission mediums (e.g., wireless radio frequency (RF), infrared (IR), and/or Microwave). Similarly, the embodiments may be adapted to communicate distance-based authentication data using various pulse-based modulation schemes including, for example, on-off keying (OOK), BPSK, N-PSK, amplitude shift keying (ASK), pulse amplitude modulation (PAM), and/or quadrature amplitude modulation (QAM). For ease of reference, the following examples may be primarily described with reference to methods and circuits which perform distance-based authentication using OOK or binary PSK (BPSK) modulation of a wireless RF signal.

The disclosed methods may be used in combination with techniques for obscuring leading edges of waveforms to further inhibit EDLC attack. For example, random-based noise may be added to leading edges of the waveforms of one or more pulses waveforms of a transmitted signal. Random-based noise may include, for example, random or pseudo-random noise. The random-based noise in the transmitted signal conceals the presence of a portion of a waveform, such as leading edge of a pulse or portions in-between pulses, relative to an attacker attempting to observe the transmitted signal (e.g., using high signal-to-noise ratio compared to the legitimate receiver). Further, such noise may be added to a limited portion of a waveform or radio packets, such as ranging portions or preamble portions of a message, while transmitting other portions of a waveform such as those involving configuration portions of a header (e.g., defining a packet length or CRC data) without such added noise. For additional information regarding obscuring waveforms using noise, reference may be made to U.S. application Ser. No. 14/615,738 (titled "COMMUNICATIONS WITH DISTANCE AUTHENTICATION"), which is fully incorporated by reference herein.

Turning now to the Figures, FIG. 1 shows a system configured to perform distance-based authentication, in accordance with various embodiments. In this example, the system 100 includes a local device 102 and remote device 104 configured for distance-based authentication. An example process performed by the local device 102 in the distance-based authentication is shown as dashed lines in block 110. An example process performed by the remote device 104 in the distance-based authentication is shown as dashed lines in block 120. At block 112, an authentication message generated by a logic circuit (e.g., 150) is communicated by a transmitter 130 in the local device 102 to the remote device 104 using secure pulse waveforms. As previously discussed, the authentication message may be communicated by modulating a signal using the secure waveforms to represent values of data symbols in the authentication message.

At block 122, a receiver 140 in the remote device 102 demodulates the authentication message and an authentication logic circuit 152 determines a response. In some embodiments, the authentication message may include a challenge message which requires calculation of a specific response. The correct response may include, for example, data encrypted in the authentication message. For instance, the remote device 104 may be configured to generate the response by decrypting the challenge data using an encryption key stored in a non-volatile memory of the remote device.

At block 126, the response message is communicated to the local device 102 by a transmitter 142 in the remote device 104 using secure pulse waveforms. At block 114, the transmitted response is received by the receiver 132 and an authentication logic circuit 150 in local device 102 determines a distance between the local and remote devices 102 and 104 based on time of flight of the authentication message and/or the response message. As an example, distance may be determined based on round trip transmission time between the devices 102 and 104 minus the processing time of the remote device 104. The processing time may be a fixed time known to the local device 102 or may be measured by the remote device 104 and communicated to the local device 102 in the response. In some implementations, the calculated processing time may be encrypted or protected by a hash so the attacker may not manipulate the value. Alternatively, in some implementations, distance may be determined based on a one-way transmission between the local and remote devices 102 and 104. The authentication logic circuit 150 authenticates the remote device 104 at block 114 as a function of the determined distance. In some implementations, the authentication performed at block 114 may additionally authenticate the device using challenge/response data communicated as part of the distance-based authentication. In some implementations, further distance-based (or other) authentication may carried out at blocks 116 and 128, such as for transmitting additional signals that serve to provide additional authentication data of one or both of the respective local and remote devices.

In this example, distance is determined based on round trip time to communicate the authentication message to the remote device 104 and communicate a response back to the local device 102. Distance determination based on round trip time may be manipulated by an attacker by modifying the authentication message, the response message, or both as discussed above. By communicating the authentication and response messages using secure waveforms that cannot be predicted from the leading edges of the waveforms, EDLC attacks can be prevented.

Figure 2:
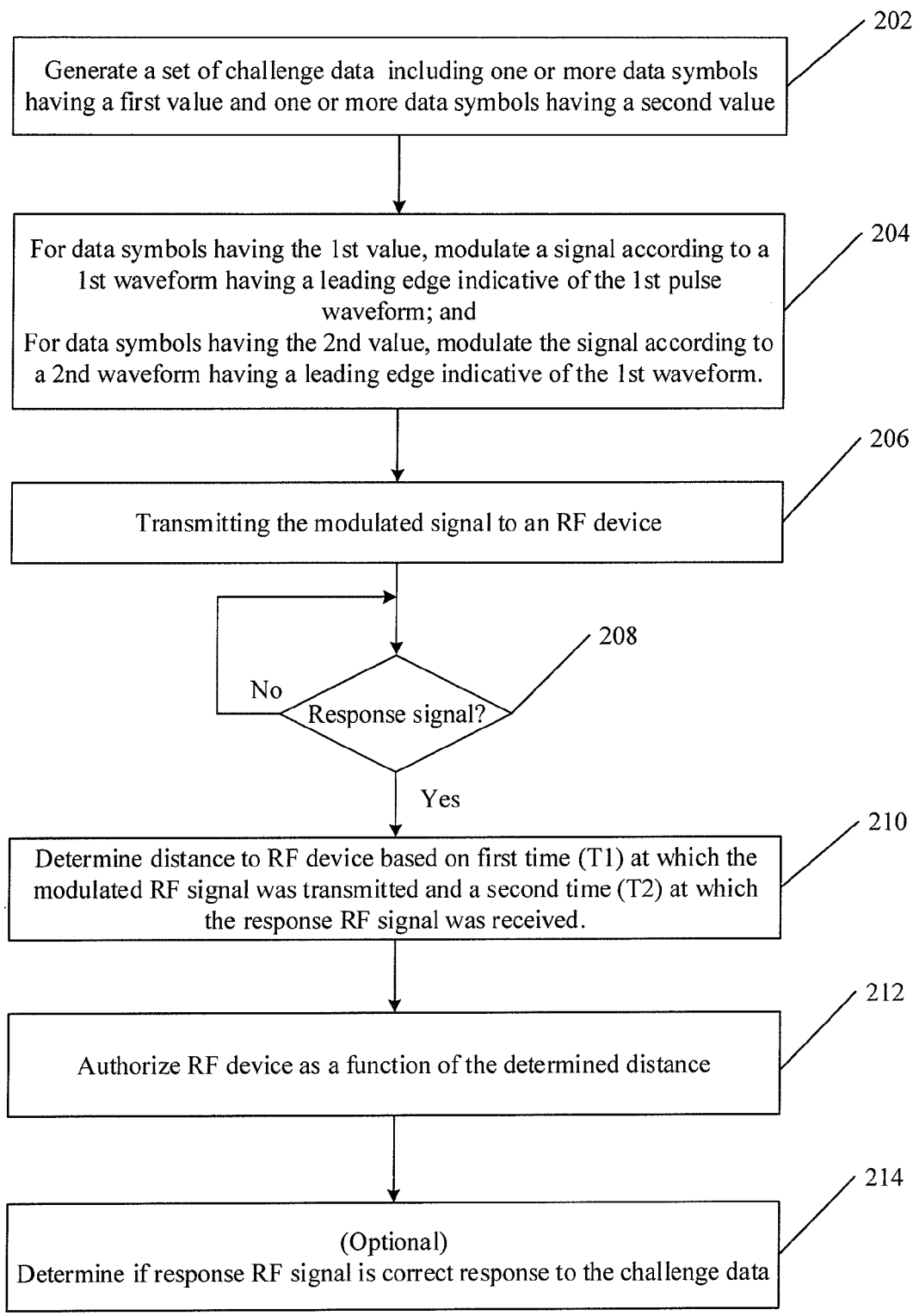
FIG. 2 shows a first example process for inhibiting EDLC attack in a distance-based authentication of a pulse-based communication device.

FIG. 2 shows an example process for inhibiting EDLC attack in a distance-based authentication of a pulse-based communication device. The process may be performed, for example, by the local device 102 in FIG. 1. At block 202, a set of challenge data is generated that includes one or more data symbols having a first value (e.g., logic 1) and one or more data symbols having a second value (e.g., logic 0). At block 204, a communication signal is generated by modulating a signal using waveforms that cannot be predicted from leading edges of the waveforms. For data symbols having the first value, the signal is modulated according to a first waveform having a leading edge indicative of the first waveform. For data symbols having the second value, the signal is modulated according to a second waveform having a leading edge indicative of the first waveform. At block 206, the modulated signal is communicated to an RF device. Because the leading edges of both waveforms are indicative of the same waveform, an attacker cannot predict which waveform is transmitted from the leading edges. In this manner, EDLC attack is inhibited.

The process waits at decision block 208 until a response signal is received. At block 210, distance to the RF device is determined based on first time (T1) at which the modulated RF signal was transmitted and a second time (T2) at which the response RF signal was received. At block 212, the RF device is authenticated as a function of the determined distance. For example, the process may require the determined distance to be less than a threshold distance in order to authorize the RF device. If the determined distance is not within a required range, the RF device is not authenticated. Optionally, further authentication may be performed at block 214. In this example, the process determines whether or not the response signal includes a correct response to the challenge data. If a correct response is not received, the RF device is not authenticated.

Figure 3:
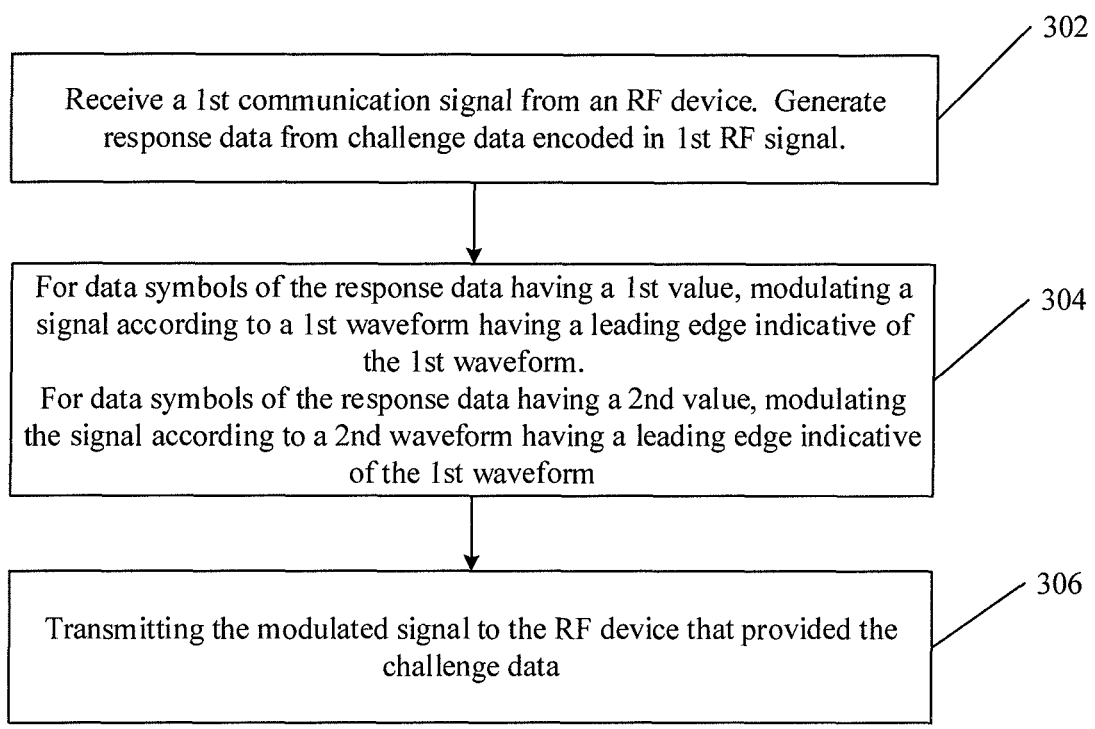
FIG. 3 shows a second example process for inhibiting EDLC attack in a distance-based authentication of a pulse-based communication device.

FIG. 3 shows an example process for inhibiting EDLC attack in a distance-based authentication of a pulse-based communication device. The process may be performed, for example, by the remote device 104 in FIG. 1. At block 302, a first communication signal is received from an RF device and a response message is generated from challenge data included in the communication signal. At block 304, a response communication signal is generated by modulating a signal using waveforms that cannot be predicted from leading edges of the waveforms. For data symbols of the response data having the first value, the signal is modulated according to a first waveform having a leading edge indicative of the first waveform. For data symbols of the response data having the second value, the signal is modulated according to a second waveform having a leading edge indicative of the first waveform. At block 306, the modulated signal is communicated to an RF device. Because the leading edges of both waveforms are indicative of the same waveform, an attacker cannot predict which waveforms are transmitted in the communication signal from examination of the leading edges. In this manner, EDLC attack is inhibited.

In some embodiments, the example processes shown in FIGS. 2 and 3 may be adapted to perform additional verification processes. For example, in some implementations, authentication may be repeated using another set of challenge-response messages or using another verification technique. As another example, in some implementations the process in FIG. 3 may be adapted to verify the communication signal received at block 302 before a response message is transmitted at block 306.

Figure 4:
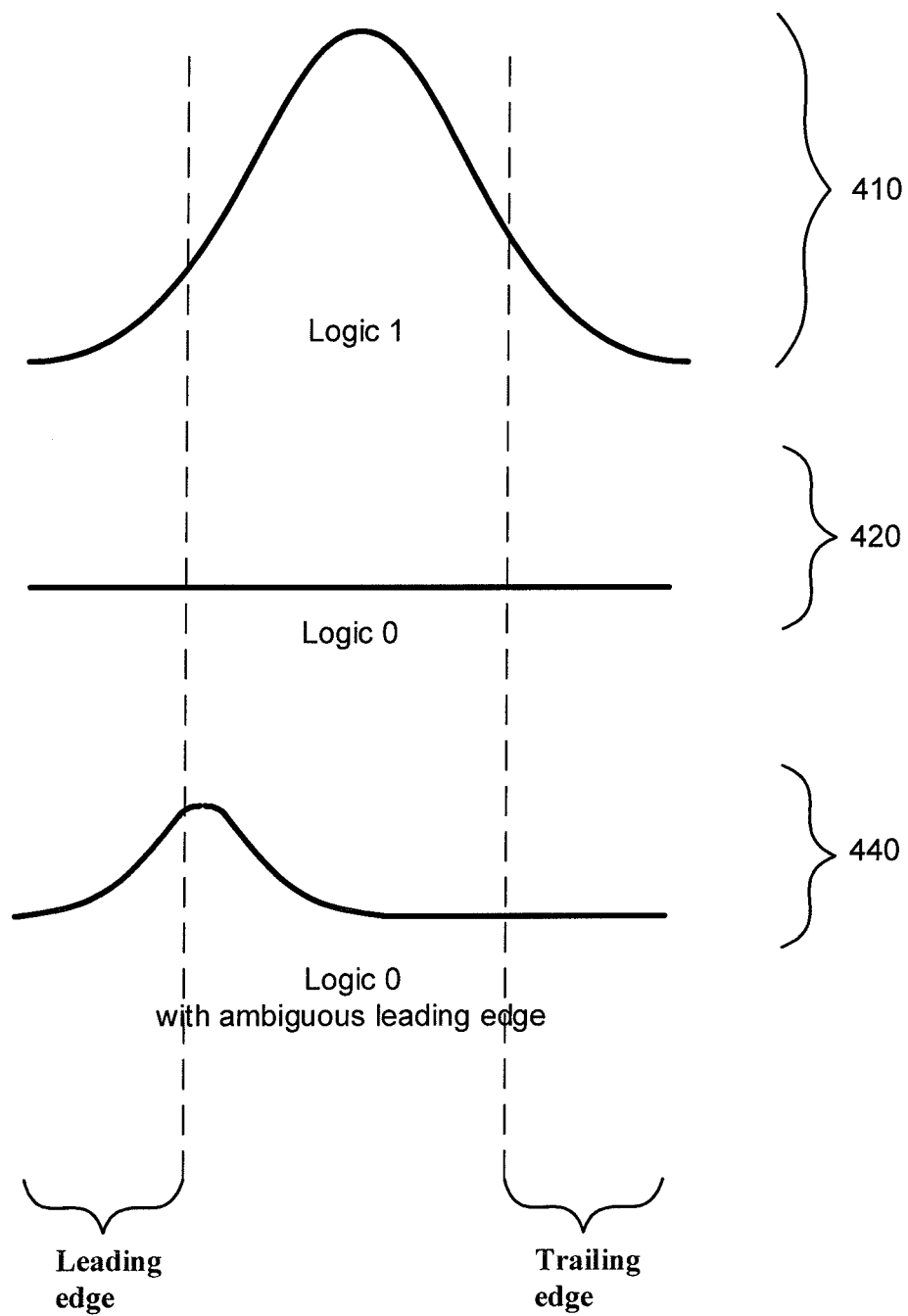
FIG. 4 shows example waveforms for modulation of a signal, in accordance with one or more embodiments.

FIG. 4 shows example waveforms for modulation of a signal, in accordance with one or more embodiments. 410 and 420 show example waveforms that may be used, for example, for on-off key modulation. As previously described, a signal may be modulated with the first waveform 410 to communicate data symbols having a first value (e.g., logic 1) and modulated with the second waveform 420 to communicate a second value (e.g., logic 0). As shown in FIG. 4, the waveforms 410 and 420 each have a center portion having different energy levels (e.g., amplitude) that may be used by a receiver to distinguish between the two waveform. In this example, the center of waveform 410 includes positive pulse peaking at an upper amplitude. In contrast, the center of waveform 420 does not include a pulse and has an amplitude below a lower threshold.

In practice, the speed at which a transmitter can adjust a signal to different amplitudes or energy levels is limited. As one example, the transition speed may be limited by the strength or capability of the transmitter. As another example, communications may be limited to a certain frequency band by a regulating authority. Due to the limited speed for transitioning a signal between different values, the waveforms each include leading and trailing edges, in which a signal transitions to exhibit a target value. As illustrated by waveforms 410 and 420, the leading edge of waveform 410 can be distinguished from the leading edge of waveform 420 by the slope, amplitude, and/or shape of the leading edge.

As previously discussed, based on these differences an attacker may be able to predict which pulse waveform is transmitted, and manipulate the transmission to cause the receiver to detect the symbol at an earlier time. Waveform 440 shows a secure waveform that may be used instead of waveform 420 to inhibit EDLC attacks. Waveform 440 is similar to waveform 420 but has a leading edge modified to have a waveform shape that is substantially similar to the leading edge of first waveform 410. In this example, the leading edge of waveform 420 is modified to be substantially similar to the leading edge of waveform 410 by adding a smaller pulse to the beginning of waveform 420. Due to the similarities of the leading edges, an attacker cannot predict whether a transmitted waveform is pulse waveform 410 or 440 based solely on examination of the leading edge.

Figure 5:
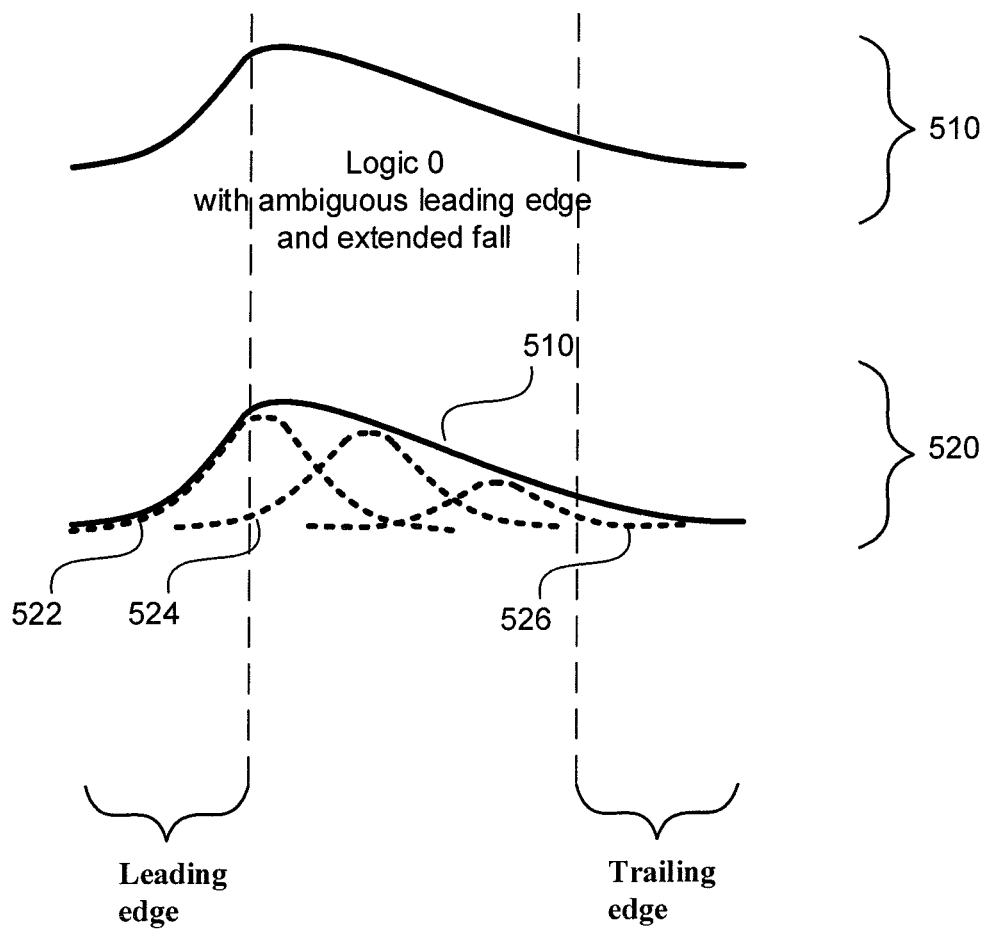
FIG. 5 shows other example waveforms for modulation of a signal, in accordance with one or more embodiments.

As previously indicated, in some applications, communications may be limited to a specific bandwidth of frequencies. However, in some applications, the small pulse forming the leading edge of waveform 440, may add a high-frequency component that exceeds bandwidth limitations of the application. In such implementations, the waveform may be further modified to exhibit less high frequency characteristics. FIG. 5 shows an example waveform 520 configured to exhibit less high-frequency characteristics. Similar to waveform 440, waveform 520 includes a small pulse having leading edge with shape similar to waveform 410. In comparison to waveform 440, the pulse in waveform 510 has a slower falling edge and therefore has a lower frequency. As shown in waveform 520, a pulse with a slow falling edge may be produced, for example, by summing multiple successive pulses 522, 524, and 526.

Figure 6:
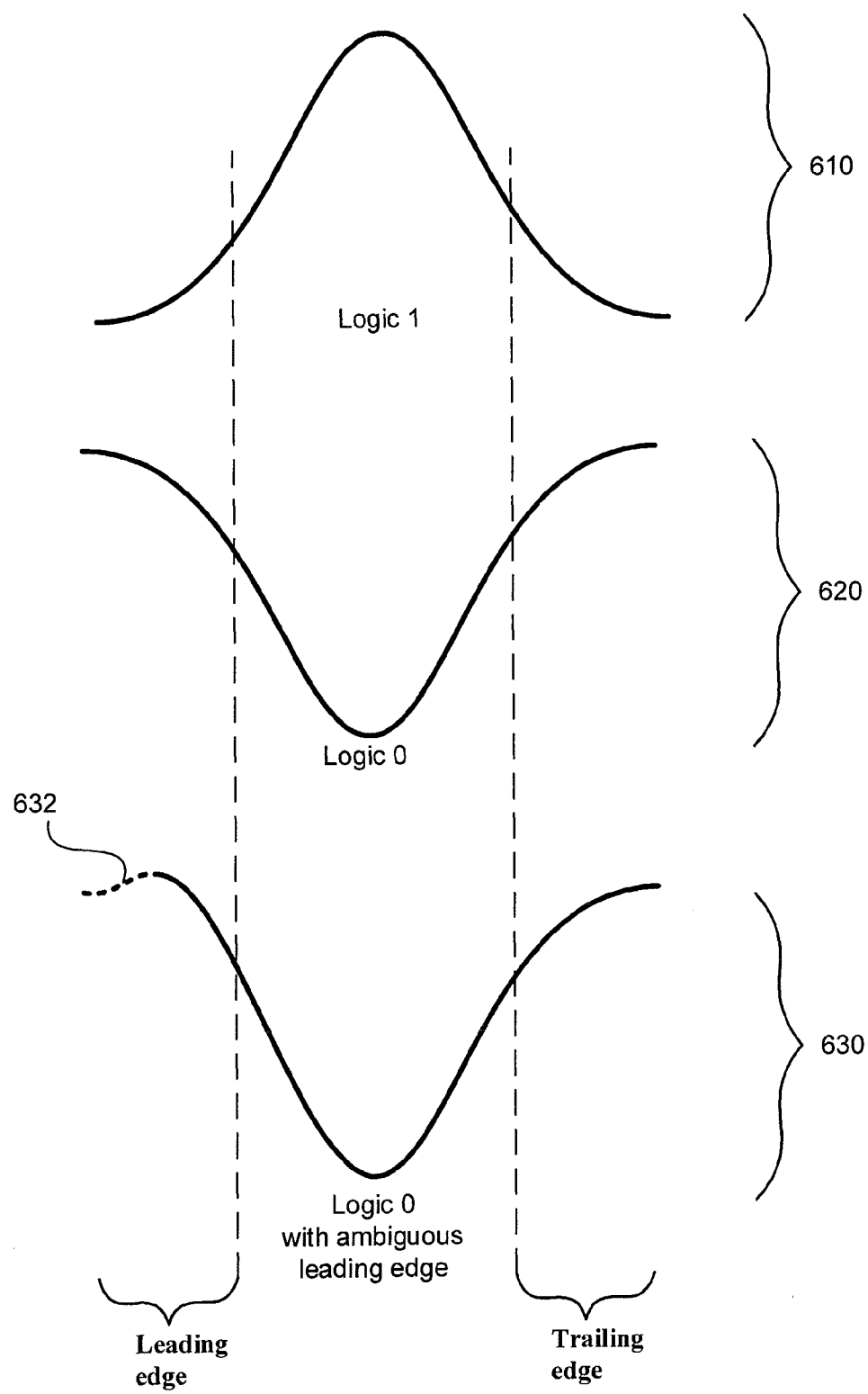
FIG. 6 shows additional example waveforms for modulation of a signal, in accordance with one or more embodiments.

As previously described, various embodiments may be adapted to for communication of data using various pulse-based modulation schemes including, for example, BPSK/N-PSK, OOK/ASK/PAM, and/or (N-)QAM. FIG. 6 shows example waveforms that may be used for communicating data using a BPSK modulation scheme. 610 and 620 show two conventional waveforms that may be used to represent first and second data values in a BPSK modulated signal. As shown in FIG. 6, the leading edges of waveform 610 have difference slopes and polarities that may be used to predict a transmitted waveform. Waveform 630 is an example secure waveform that may be used instead of waveform 620 to inhibit EDLC attack. Waveform 630 has a leading edge that initially rises, similar to waveform 610, before sinking to form a negative pulse. The initial rising edge 632 is similar to the leading edge of waveform 610 and makes it more difficult to predict the waveform from examination of the leading edge.

Figure 7:
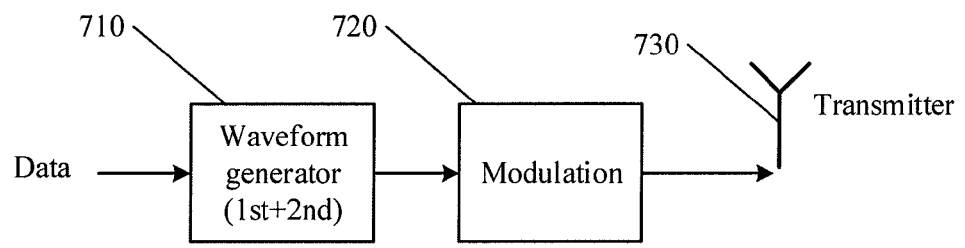
FIG. 7 shows a first example circuit for communicating data using secure waveforms.

Various circuits may be used to communicate data using secure waveforms. FIG. 7 shows a first example circuit for communicating data using secure waveforms. In this example, the circuit includes a waveform generator 710 configured to generate secure waveforms in response to an input data signal. The waveform generator 710 is configured to output a first one of the secure waveforms in response to the input data signal having a first value (e.g., logic 1) and output a second one of the secure waveforms in response to the input data signal having a second value (e.g., logic 0). As described above, the first and second waveforms have leading edges having characteristics (e.g., similar shape, slope, amplitude, and/or polarity) to prevent prediction of the waveform from examination of the leading edge. A modulation circuit 720 is coupled to receive the waveforms output by the waveform generator 710. The modulation circuit 720 modulates a signal using the received waveforms to produce a modulated signal. A transmitter 730 coupled to the modulation circuit 720 is configured to transmit the modulated signal over a transmission medium (e.g., a wireless communication channel).

Figure 8:
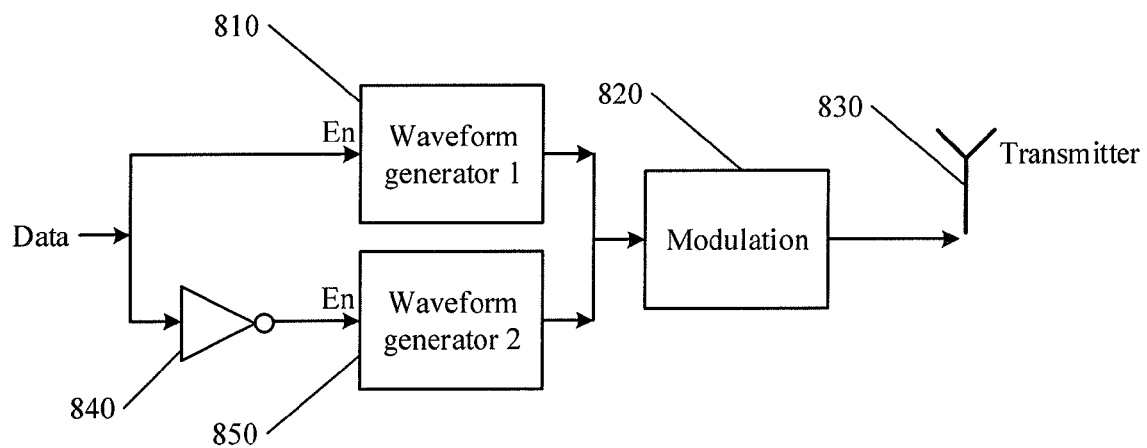
FIG. 8 shows a second example circuit for communicating data using secure waveforms.

FIG. 8 shows a second example circuit for communicating data using secure waveforms. In this example, the circuit includes two waveform generators 810 and 850 configured to generate respective secure waveforms when enabled. Waveform generator 810 is configured to generate a first one of the secure waveforms and waveform generator 850 is configured to generate a second one of the secure waveforms. As described above, the first and second waveforms have leading edges having characteristics (e.g., similar shape, slope, amplitude, and/or polarity) to prevent prediction of the waveform from examination of the leading edge.

In this example, each of the waveform generators 810 and 850 is enabled when an input to the waveform generator is set to a logic 1 and is disabled when the input is set to a logic zero. An input data signal is provided to the input of waveform generator 810. An inverter circuit 840 is configured to provide an inversion of the input data signal to the input of waveform generator 850. In this configuration, waveform generator 810 is enabled when the input data signal is set to logic 1 and waveform generator 850 is enabled when the input data signal is set to logic 0. A modulation circuit 820 is coupled to receive the waveforms output by the waveform generators 810 and 850. The modulation circuit 820 modulates a signal using the received waveforms to produce a modulated signal. A transmitter 830 coupled to the modulation circuit 820 is configured to transmit the modulated signal over a transmission medium (e.g., a wireless communication channel).

Various blocks, modules or other circuits may be implemented to carry out one or more of the operations and activities described herein and/or shown in the figures. In these contexts, a "block" (also sometimes "logic circuitry" or "module") is a circuit that carries out one or more of these or related operations/activities (e.g., transmitting TOF signals or generate TOF responses, obscuring a leading edge, signal generation, comparing received data with stored data or otherwise involving encryption for authentication). For example, in certain of the above-discussed embodiments, one or more modules are discrete logic circuits or programmable logic circuits configured and arranged for implementing these operations/activities, as in the circuit modules shown in FIGS. 1, 7, and 8. The operations carried out in remote device 120 of FIG. 1 may be carried out in a logic circuit programmed to operate the indicated steps. In certain embodiments, such a programmable circuit is one or more computer circuits programmed to execute a set (or sets) of stored instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions. In addition, the various embodiments described herein may be combined in certain embodiments, and various aspects of individual embodiments may be implemented as separate embodiments. For instance, aspects of FIG. 1 may be implemented using one or more transmitters as depicted in other figures.

Certain embodiments are directed to a computer program product (e.g., nonvolatile memory device), which includes a machine or computer-readable medium having stored instructions thereon which may be executed by a computer (or other electronic device) to perform these operations/activities.

Based upon the above discussion and illustrations, those skilled in the art will readily recognize that various modifications and changes may be made to the various embodiments without strictly following the exemplary embodiments and applications illustrated and described herein. For example, communications can be obscured for TOF challenges at one or both of respective devices that are communicating. Similarly, further authentication communications (e.g., with encrypted authentication data) can be obscured in a similar manner. In addition, the combination of noise with a signal can be carried out at different stages, such as after or before amplification as shown. Such modifications do not depart from the true spirit and scope of various aspects of the invention, including aspects set forth in the claims.

What is claimed is:

1. A method for generating a communication signal that is decodable according to a first mapping of a first data symbol to a first waveform having a leading edge that is indicative of the first waveform, and a second mapping of a second data symbol to a second waveform having a second leading edge that is indicative of the second waveform, the method comprising:
    using a circuitry, generating a plurality of data symbols that includes the first data symbol and the second data symbol;
    modulating, for the first data symbol, a first portion of the communication signal according to the first waveform;
    modulating, for the second data symbol, a second portion of the communication signal according to a modified second waveform, the modified second waveform having a leading edge that is indicative of the first waveform;
    transmitting the communication signal over a transmission medium to a remote device; and
    authenticating the remote device based on a response from the remote device.

2. The method of claim 1, further comprising a communications circuit, communicatively coupled with the circuitry, and of generating the modified second waveform by modifying the leading edge of the second waveform to include one or more characteristics indicative of the first waveform.

3. The method of claim 2, wherein modifying of the leading edge of the second waveform includes modifying the leading edge to have a shape substantially similar to a shape of the leading edge of the first waveform.

4. The method of claim 1, wherein
    the communication signal is generated by modulating the communication signal using a set of waveforms including the first and second waveforms and one or more additional waveforms, each of the set of waveforms being mapped to a respective data symbol; and
    the method further comprises, for at least one data symbol of the plurality of data symbols,
        pseudo-randomly selecting a leading edge from a plurality of leading edges, and
        modulating the communication signal using the waveform mapped to the data symbol modified to exhibit the selected leading edge.

5. The method of claim 1, wherein the second waveform is an inversion of the first waveform, and wherein transmitting the communication signal over a transmission medium includes transmitting the communication signal, as modulated by the steps of modulating, over a transmission medium.

6. The method of claim 1, further comprising the step of using circuitry to perform each of the above steps and wherein
    the plurality of data symbols includes a set of response data generated as a function of, and in response to, a set of challenge data received from a radio frequency (RF) device; and
    the transmitting of the communication signal includes transmitting the communication signal to the RF device.

7. The method of claim 6, further comprising generating the response data by decrypting the set of challenge data according to a decryption key stored in a memory circuit.

8. The method of claim 7, further comprising, at the RF device, determining a distance to the RF device based on an a difference between a first time at which the set of challenge data is transmitted by the RF device and a second time at which the communication signal is received by the RF device.

9. The method of claim 1, wherein
    the plurality of data symbols includes a set of challenge data;
    the transmitting of the communication signal transmits the communication signal to an RF device over a wireless transmission medium; and
    the method further comprises
        receiving a second communication signal from the RF device, the second communication signal encoding a set of response data, and
        determining a distance to the RF device based on an amount of time between the transmitting of the first-mentioned communication signal and the receiving of the second communication signal.

10. The method of claim 9, further comprising:
    determining whether or not the set for response data is a correct response to the set of challenge data; and
    wherein the determining a distance to the RF device is performed in response to determining that the set of response data is a correct response to the set of challenge data.

11. An apparatus comprising:
    a first circuit configured and arranged to generate a plurality of data symbols that includes a first data symbol and a second data symbol; and
    a second circuit coupled to the first circuit and configured and arranged to generate a communication signal that is decodable according to a mapping of the first data symbol to a first waveform having a leading edge that is indicative of the first waveform, and a mapping of the second data symbol to a second waveform having a leading edge that is indicative of the second waveform, the second circuit including a modulation circuit configured and arranged to
        modulate, for the first data symbol, a first portion of the communication signal according to the first waveform; and
        modulate, for the second data symbol, a second portion of the communication signal according to a modified second waveform, the modified second waveform having a leading edge that is indicative of the first waveform; and a third circuit coupled to the second circuit and configured and arranged to transmit the communication signal over a transmission medium to a remote device and to authenticate the remote device based on a response from the remote device.

12. The apparatus of claim 11, wherein the second circuit includes a waveform generation circuit configured and arranged to generate the first waveform and the modified second waveform.

13. The apparatus of claim 12, wherein the waveform generation circuit is configured and arranged to
   generate the second waveform; and
   modify the leading edge of the second waveform to include one or more characteristics indicative of the first waveform to generate the modified second waveform.

14. The apparatus of claim 13, wherein the waveform generation circuit is configured and arranged to modify the leading edge of the second waveform to have a shape substantially similar to a shape of the leading edge of the first waveform.

15. The apparatus of claim 14, wherein the waveform generation circuit is configured and arranged to modify the leading edge of the second waveform by replacing the leading edge of the second waveform with the leading edge of the first waveform.

16. The apparatus of claim 11, wherein
   the first circuit is configured to generate a set of response data included in the plurality of data symbols as a function of, and in response to, a set of challenge data received from a radio frequency (RF) device; and
   the third circuit is configured and arranged to transmit the communication signal to the RF device.

17. The apparatus of claim 16, wherein
the apparatus is a remote key fob for an automobile; and
the RF device includes a control system configured to engage one or more systems in the automobile in response to authenticating the communication signal.

18. The apparatus of claim 11, wherein
the first circuit is configured to generate a set of challenge data included in the plurality of data symbols;
the third circuit is configured and arranged to transmit the communication signal to an RF device; and
the first circuit is further configured to:
   receive a second communication signal including a set of response data from the RF device; and
   determining a distance to the RF device based on an amount of time between the transmitting of the first-mentioned communication signal and the receiving of the second communication signal.

19. The apparatus of claim 18, wherein
the apparatus includes a control system in an automobile, the control system being configured to engage one or more systems in an automobile in response to determining that the distance to the RF device is less than a threshold distance stored in a non-volatile memory; and
the RF device is a remote key fob.

20. The apparatus of claim 11, wherein
the leading edge of the first waveform has a positive slope;
the leading edge of the second waveform has a non-positive slope; and
the leading edge of the modified second waveform has a positive slope.

* * * * *